United States Patent [19]
Lee et al.

[11] Patent Number: 6,081,399
[45] Date of Patent: *Jun. 27, 2000

[54] DISK DRIVE HAVING DOUBLE HEADS AND METHOD FOR CONTROLLING HEAD SWITCHING

[75] Inventors: Nam-Kyu Lee; Tack-Don Han, both of Seoul; Shin-Dug Kim, Goyang; Hye-Jeong Nam, Kwangmyeong, all of Rep. of Korea

[73] Assignee: Samsung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/638,376

[22] Filed: Apr. 26, 1996

[30] Foreign Application Priority Data

Aug. 1, 1995 [KR] Rep. of Korea ........................ 95/23718

[51] Int. Cl.[7] .................................................... G11B 21/02
[52] U.S. Cl. ................................. 360/75; 360/61; 360/71
[58] Field of Search .................................. 360/75, 78.04, 360/78.06, 78.4, 78.12, 86, 97.01, 105, 106, 72.2, 61, 62, 63, 64, 77.07, 22, 78.09, 72.1, 78, 112, 71, 78.01, 69

[56] References Cited

U.S. PATENT DOCUMENTS

| | | | |
|---|---|---|---|
| 4,164,769 | 8/1979 | Kaseta et al. | 360/106 |
| 4,388,655 | 6/1983 | Zenzefilis | 360/86 |
| 4,423,448 | 12/1983 | Frandsen | 360/106 |
| 4,724,495 | 2/1988 | Hedberg et al. | 360/22 |
| 4,787,001 | 11/1988 | Okutsu | 360/106 |
| 5,172,287 | 12/1992 | Ishida | 360/105 |
| 5,218,496 | 6/1993 | Kaczeus | 360/106 |
| 5,257,143 | 10/1993 | Zangenehpour | 360/72.1 X |
| 5,343,345 | 8/1994 | Gilovich | 360/104 |
| 5,343,347 | 8/1994 | Gilovich | 360/78.12 X |
| 5,355,486 | 10/1994 | Cornaby | 368/78.12 X |
| 5,469,414 | 11/1995 | Okamura | 360/78.09 |
| 5,482,497 | 1/1996 | Gonnella et al. | 360/135 X |
| 5,550,696 | 8/1996 | Nguyen | 360/135 |
| 5,596,458 | 1/1997 | Emo et al. | 360/48 |

FOREIGN PATENT DOCUMENTS 0281483  11/1990  Japan ................................. 360/78.12

*Primary Examiner*—Glenton B. Burgess
*Assistant Examiner*—K. Wang
*Attorney, Agent, or Firm*—Robert E. Bushnell, Esq.

[57] ABSTRACT

A disk drive constructed according to an exemplary embodiment of the present invention includes a disk having a plurality of tracks formed concentrically along a first surface of the disk for storing data. The tracks are divided into first and second data storage regions positioned between an innermost circumferential region and an outermost circumferential region of the disk. First and second heads write and read data to and from the first surface of the disk. The first head is positioned to access the first data storage region while the second head is positioned to access the second data storage region, and the first head being positioned to access the second data storage region while the second head is positioned to access the first data storage region. First and second arm assemblies are respectively connected to the first and second heads. The first arm assembly extends the first head over a first radius of the disk, and the second arm assembly extends the second head over a second radius of the disk. An actuator shifts the first and second heads among the tracks by driving the first and second arm assemblies. A control unit enables selection of the one of the first and second heads that is closer to a target position on the first surface of the disk so that the closer head can access the data at the target track.

12 Claims, 13 Drawing Sheets

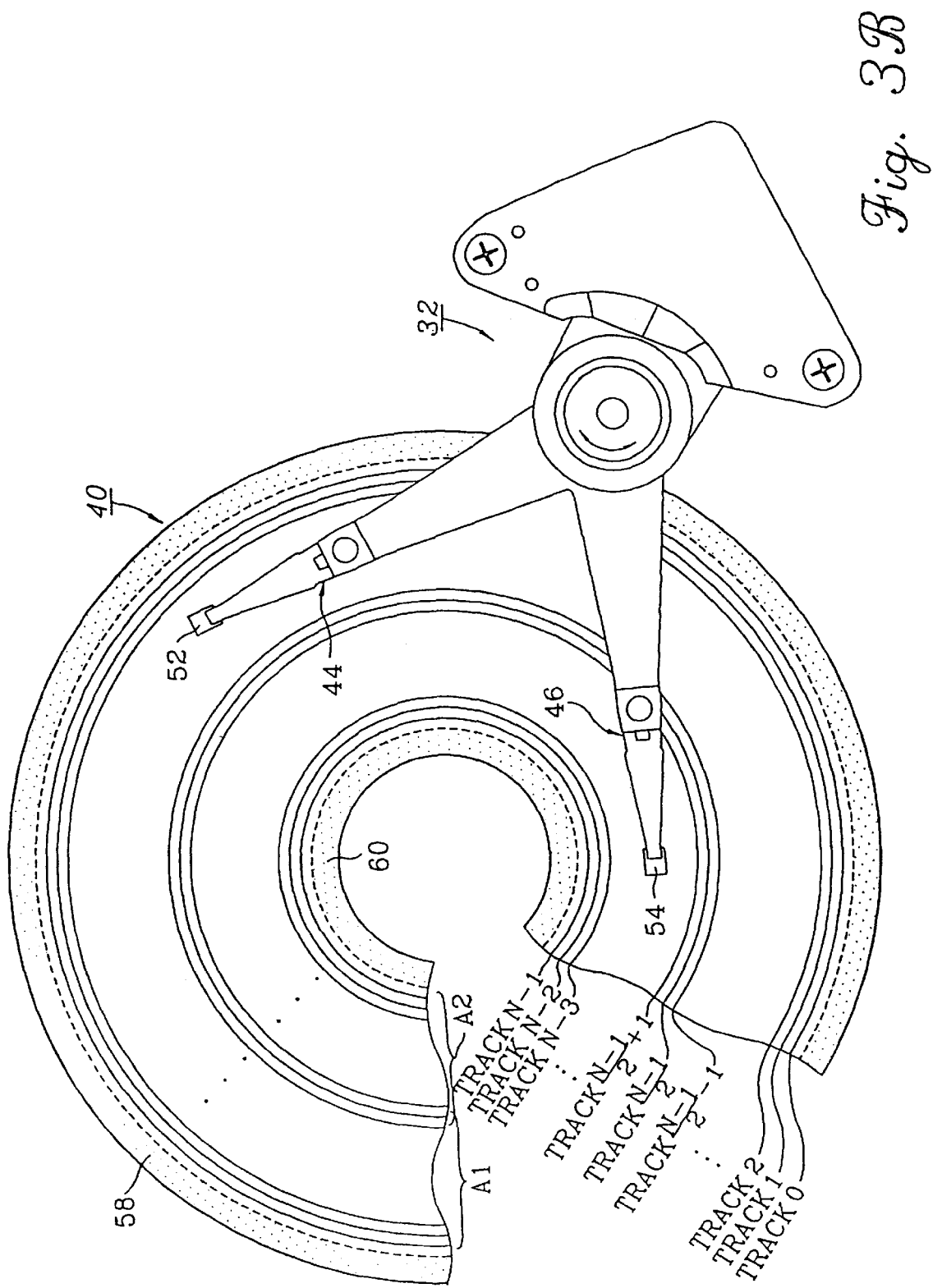

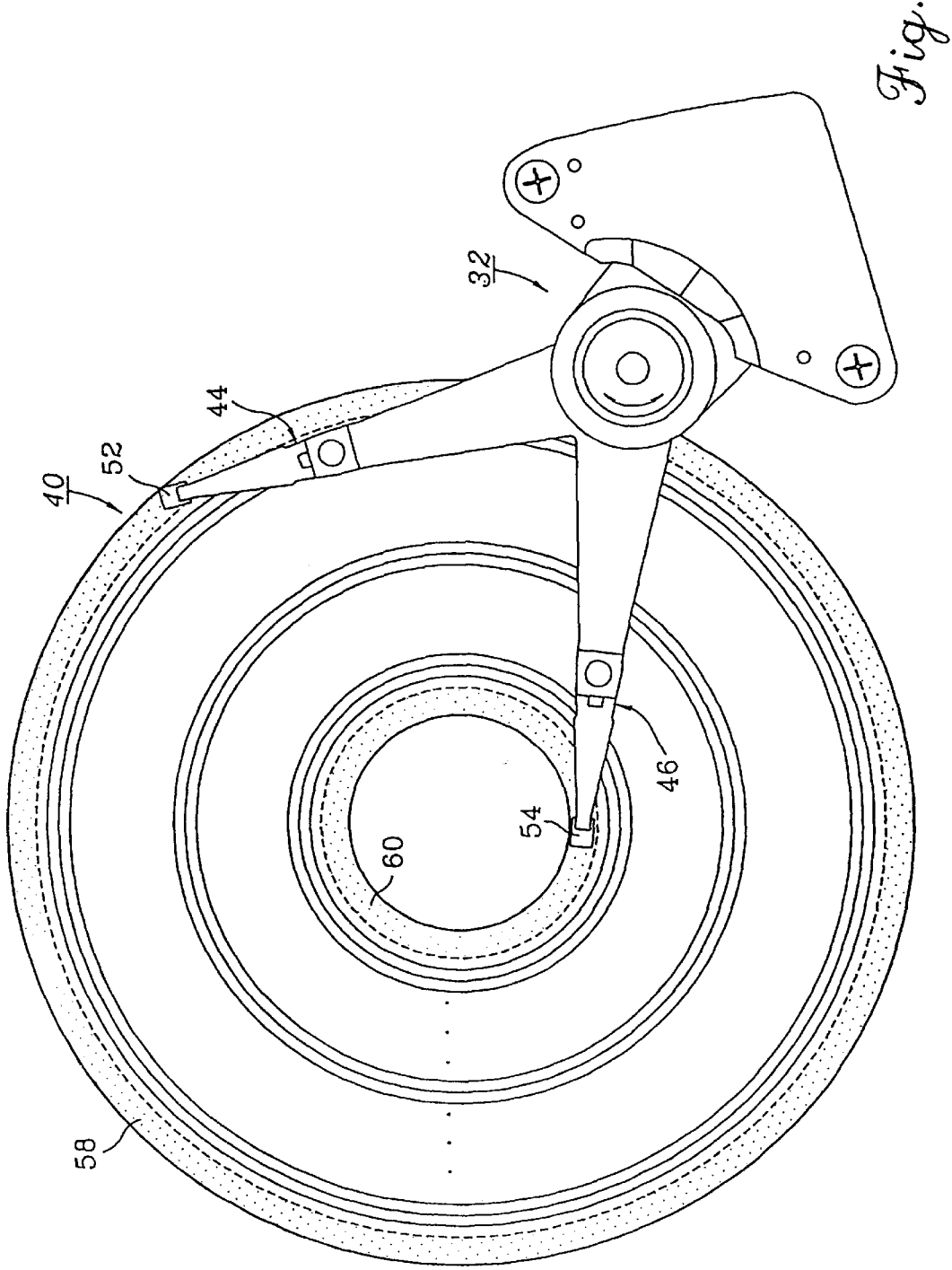

DISK DRIVE HAVING DOUBLE HEADS AND METHOD FOR CONTROLLING HEAD SWITCHING

CROSS-REFERENCE TO RELATED APPLICATIONS

This application makes reference to, incorporates the same herein, and claims all benefits accruing under 35 U.S.C. §119 from an application for Disk Drive Having Double Heads And Method For Controlling Head Switching earlier filed in the Korean Industrial Property Office on Aug. 1, 1995 and there assigned Ser. No. 23718/1995.

BACKGROUND OF THE INVENTION

The present invention relates to a disk drive, and more particularly, to a disk drive having double heads for accessing data on a disk and a method for controlling head switching.

In general, a magnetic disk drive, such as a hard disk drive (HDD), can access a large amount of data at a high speed, and therefore is being widely used as an auxiliary storage unit for a computer system.

In a hard disk drive (HDD), data is stored on tracks arranged concentrically and radially along the magnetic disk. These tracks are accessed by a magnetic head or a data-transducer for reading out, writing, and erasing the data on the disk. This is performed as the head flies over the tracks of the disk. The head is shifted radially by the control of a head position servo mechanism capable of selectively positioning the head on certain tracks of the disk. To selectively position the head on a specific track, a current position of the head should first be identified.

The servo data indicative of the position of the head corresponding to the track is provided by a specific servo pattern read from the disk. The servo pattern is permanently written on the disk during manufacture. The servo pattern is used as track position data, and is sought by the head when accessing the data on the disk. For example, in order to provide the track position data, an embedded servo method has been used. With the embedded servo method, the servo data is alternately arranged between data regions on the disk. Servo data includes head position data, a track number (i.e., track address), and an index.

An operation to position the head on a specific track using the servo data is performed in the following two steps: one is a track seeking operation, and the other is a track following operation. With the track seeking operation the head is shifted from a current track to a desired track. With the track following operation, the head follows the desired track. Therefore, when the head is positioned on the desired track, the head follows the center line of the track to enable proper performance of the reading and writing operations. An actuator shifts the head radially along the surface of the disk in the track seeking operation, and enables the head to follow the desired track in the track following operation.

Typically, a plurality of disks are mounted in a stack by a spindle in a hard disk drive (HDD), and each disk surface corresponds to a single head. Each head reads and writes data from and on a corresponding disk. In this type of configuration, the actuator is typically combined with a single E-block assembly comprised of a plurality of support arms. A conventional E-block assembly is described in detail in U.S. Pat. No. 5,095,396 entitled Single E-block Assembly for Disk Drive issued to John S. Putnam on Mar. 10, 1992. Corresponding head gimbals assemblies (HGAs) are combined to the ends of the plurality of support arms extending from the E-block assembly. The head gimbals assemblies (HGAs) are formed such that their heads are combined with the ends of corresponding support arms by suspensions. Therefore, all heads are shifted together along the corresponding disk surfaces by the actuator.

As a separate matter, the performance of processors and memories is becoming drastically better, whereas hard disk drive (HDD) performance, in regards to disk access time, is advancing at a slower pace. For this reason, enhancing disk access time is becoming a more important goal to achieve. Disk access time is the total sum of the seek time, the latency time and the data transfer time. In a general data processing environment, the seek time required to detect a specific target track represents a large portion of the total disk access time. As a matter of fact, it represents substantially more than 50% of the total disk access time.

A conventional disk drive functions such that a head allocated to a disk surface seeks a target track on the disk, follows the target track, and reads or records data from or on the target track. Accordingly, since the head seeks the track by moving around the corresponding regions on the disk surface, the track seeking operation requires a considerable amount of time.

SUMMARY OF THE INVENTION

Accordingly, it is an object of the present invention to provide an improved disk drive and method for controlling head switching in the disk drive.

It is another object to provide a disk drive capable of reducing the amount of time required to perform a track seeking operation.

It is still another object to provide a disk drive having double heads allocated to different positions along a single disk surface.

To achieve these and other objects, a disk drive constructed according to an exemplary embodiment of the present invention provides a disk having a plurality of tracks formed concentrically along a first surface of the disk for storing data. The tracks are divided into first and second data storage regions positioned between an innermost circumferential region and an outermost circumferential region of the disk. First and second heads write and read data to and from the first surface of the disk. The first head is positioned to access the first data storage region while the second head is positioned to access the second data storage region, and the first head being positioned to access the second data storage region while the second head is positioned to access the first data storage region. First and second arm assemblies are respectively connected to the first and second heads. The first arm assembly extends the first head over a first radius of the disk, and the second arm assembly extends the second head over a second radius of the disk. An actuator shifts the first and second heads among the tracks by driving the first and second arm assemblies. A control unit enables selection of the one of the first and second heads that is closer to a target position on the first surface of the disk so that the closer head can access the data at the target track.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements, wherein:

FIGS. 3A and 3B illustrate examples of the allocation of an access region on a disk for head switching according to the embodiment of FIG. 2;

FIG. 4 illustrates a parking state according to the embodiment of FIG. 2;

DETAILED DESCRIPTION OF THE PREFERRED EMBODIMENTS

Figure 1:
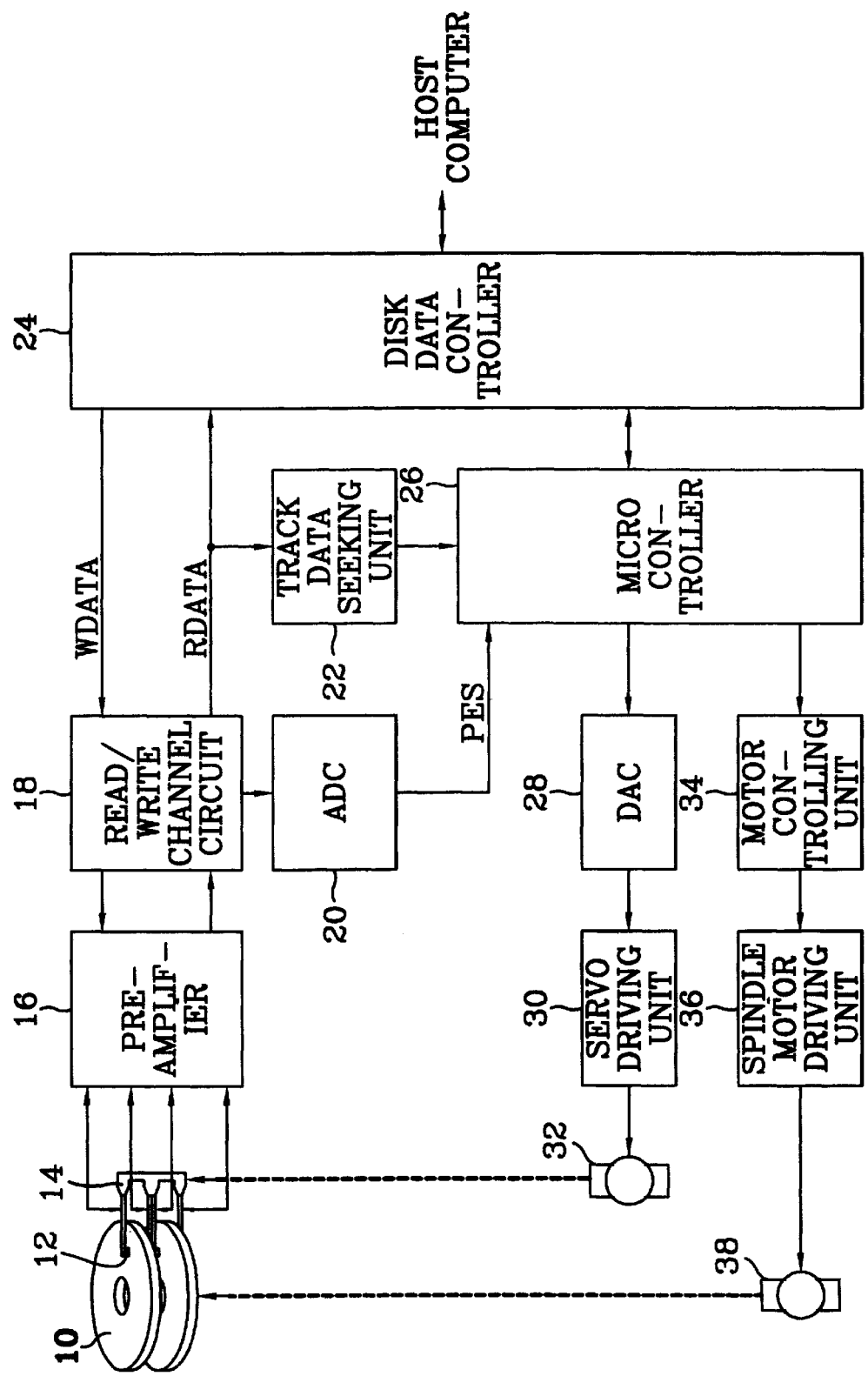
FIG. 1 is a block diagram illustrating a general hard disk drive.

It should be noted that in the drawings, a number of detailed characteristics, such as a specific structure and position of head gimbals assemblies (HGAs), the number of disks and heads, and a specific processing flow, are provided for a general understanding of the present invention. The fact that the present invention can be embodied without these specific details will be understood by those skilled in the art. Detailed descriptions of well known functions or components related to the present invention have been omitted in order not to obscure the present invention.

Turning now to the drawings and referring to FIG. 1, a block diagram of general hard disk drive (HDD) is shown. The block diagram of FIG. 1 includes two magnetic disks 10, and four magnetic heads 12 mounted to access the top and bottom sides of the two disks 10. Disks 10 rotate by a spindle motor 38. Heads 12 are mounted to corresponding support arms extending from an E-block assembly 14 connected to a rotary voice coil actuator 32. A pre-amplifier 16 amplifies signals read by heads 12, and provides the read analog signals to a read/write channel circuit 18 during a reading operation. During a writing operation, encoded write data is provided from read/write channel circuit 18 and written onto a disk 10 by a corresponding head 12. Pre-amplifier 16 includes a switching unit for selecting one of the heads 12 by the control of a disk data controller (DDC) 24 controlled by a microcontroller 26. An integrated circuit, such as a read/write device SSi 32R2026R manufactured and sold by Silicon Systems Co., ltd. can be used to embody pre-amplifier 16. Read/write channel circuit 18 seeks and decodes a data pulse from the read signal applied from pre-amplifier 16, generates reading data (RDATA), decodes writing data (WDATA) provided from disk data controller (DDC) 24 and applies the writing data (WDATA) to pre-amplifier 16. Read/write channel circuit 18 demodulates head position data, which is a portion of the servo data written on disk 10, and generates a position error signal (PES). A reading channel, SSI 32P4742/4742A/4746/4746A having the integrated circuits 1,7ENDEC, 4-burst Servo manufactured and sold by Silicon Systems Co., Ltd. can be used to embody read/write channel circuit 18. The position error signal (PES) generated from read/write channel circuit 18 is applied to an analog-to-digital converter (ADC) 20, and the reading data (RDATA) is applied to a track data seeking unit 22 and disk data controller (DDC) 24. Analog-to-digital converter (ADC) 20 converts the position error signal (PES) into a digital value corresponding to its level, and supplies the result to microcontroller 26. Track data seeking unit 22 seeks a track number at which the current head is placed from reading data (RDATA), and supplies this information to microcontroller 26. Disk data controller (DDC) 24 is controlled by microcontroller 26, and reads data provided from a host computer for output on disk 10 through read/write channel circuit 18 and pre-amplifier 16, or transmits read data from disk 10 to the host computer. Moreover, disk data controller (DDC) 24 provides an interface for communication between the host computer and microcontroller 26. Microcontroller 26 responds to reading and writing commands received from the host computer, controls disk data controller (DDC) 24, and controls the track seeking and following operations. Microcontroller 26 controls the track seeking and following operations by using the track number provided from track data seeking unit 22 and the position error signal (PES) provided from analog-to-digital converter (ADC) 20. A digital-to-analog converter (DAC) 28 converts a digital signal generated from microcontroller 26 for controlling the position of heads 12 into an analog signal. A servo driving unit 30 generates the current for driving actuator 32 by the signal provided from digital-to-analog converter (DAC) 28, and applies the current to the voice coil of actuator 32. Actuator 32 shifts heads 12 in accordance with the direction and magnitude of the current applied from servo driving unit 30. A motor controlling unit 34 controls a spindle motor driving unit 36 in accordance with a control value generated from microcontroller 26 for controlling the rotation of disks 10. Spindle motor driving unit 36 rotates disks 10 by driving a spindle motor 38 according to the control of motor controlling unit 34.

Figure 2:
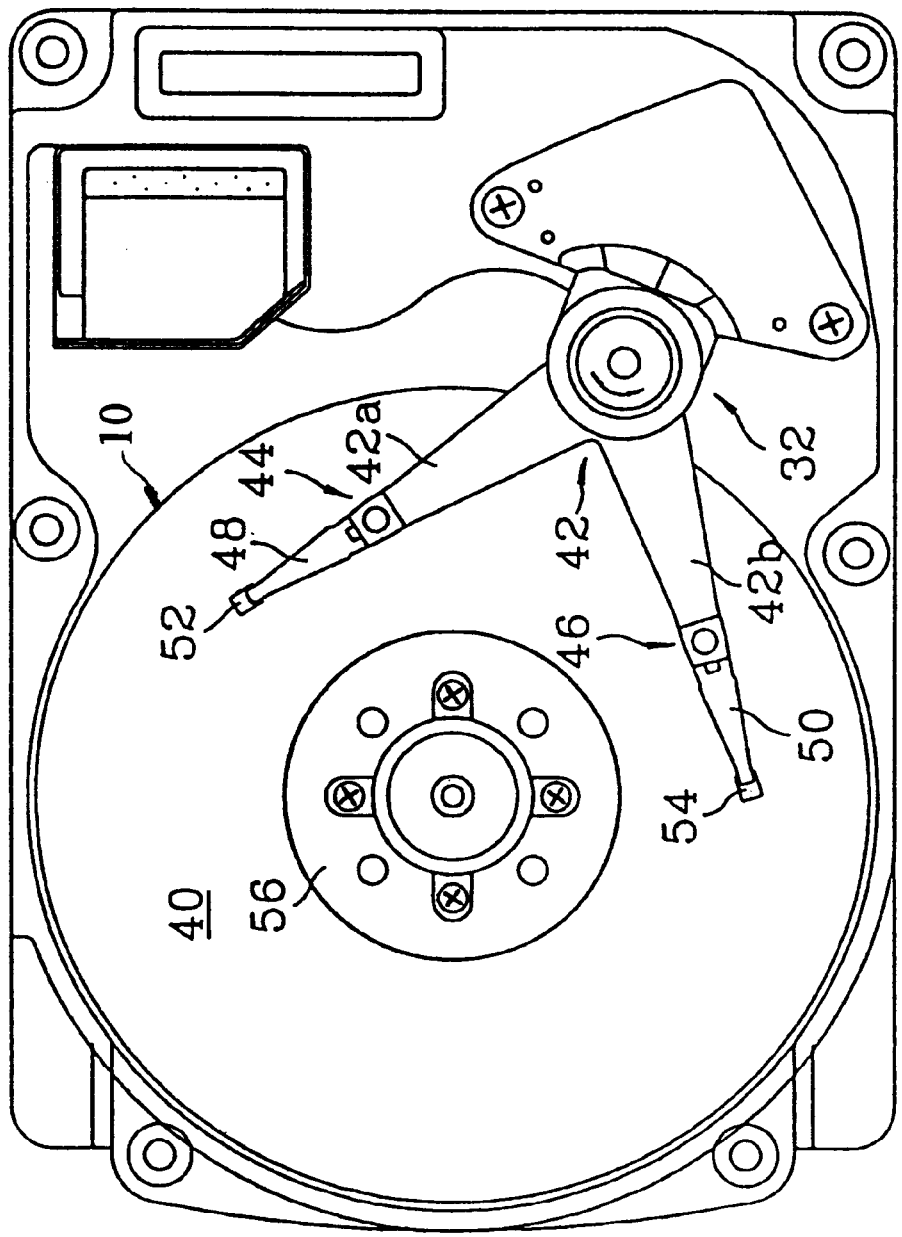
FIG. 2 illustrates an exemplary configuration of a hard disk assembly constructed according to an embodiment of the present invention.

FIG. 2 illustrates an exemplary configuration of a hard disk assembly constructed according to an embodiment of the present invention. In FIG. 2, two head gimbals assemblies (HGAs) 44 and 46 are mounted over one disk surface 40. A support arm 42 is extended in the form of a "V", having one side connected to actuator 32, and another side divided into two sub-arms, namely a first arm 42a and a second arm 42b. First and second head gimbals assemblies (HGAs) 44 and 46 are connected to the ends of first and second arms 42a and 42b. First and second arms 42a and 42b are integrally formed at one end connected to actuator 32, but are separated at their other ends and extend on both sides of a rotation axis of disk 10. That is, first arm 42a extends outwardly to operate in correspondence with a first radius of disk 10, and second arm 42b extends outwardly to operate in correspondence with a second radius of disk 10. First and second heads 52 and 54 are respectively connected to ends of first and second arms 42a and 42b via first and second suspensions 48 and 50. A spindle 56 is combined with spindle motor 38 of FIG. 1, and rotates disk 10 by driving spindle motor 38.

Additionally, first and second heads 52 and 54 are positioned in a spaced-apart manner to operate over different radii of one disk surface 40. The distance between first and second heads 52 and 54 is set so that when one of the first or second heads 52 and 54 is positioned at an outermost circumferential region of disk surface 40, the other head is positioned at an innermost circumferential region of disk surface 40.

When performing head switching with the configuration shown in FIG. 2, first and second heads 52 and 54 access the tracks between the innermost circumferential region and the outermost circumferential region of disk surface 40 by being respectively allocated to two halved data storage regions, or one of the heads 52 and 54 that is closer to a target track from its current position is selected as the head to access the disk surface 40. At this time, a switching unit employed in pre-amplifier 16 of FIG. 1 is used for selecting one of the heads 52 and 54. In conventional art, the suitable head is simply selected by switching among a plurality of heads corresponding to different disk surfaces. In the present invention, however, since heads 52 and 54 are allocated to one disk surface 40, one of the two heads should be selected according to the location of the target track. A data storage region on disk surface 40 includes: a data region in which data is written and read, a boot region, a file allocation table (FAT) region, and a system region used as a root directory region.

Figure 3A:
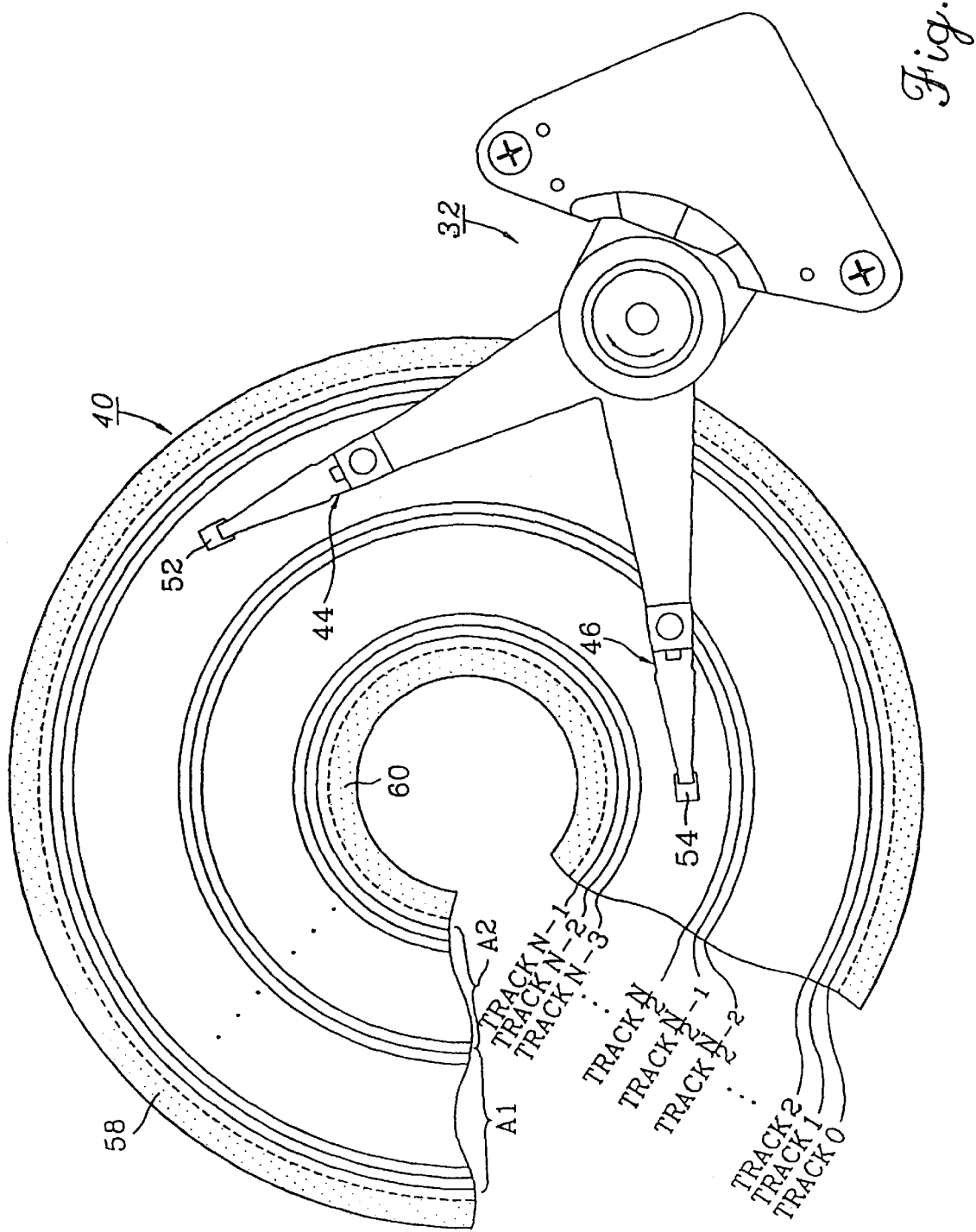

As illustrated in FIGS. 3A and 3B, disk surface 40 is divided into two data storage regions and first and second heads 52 and 54 are respectively allocated to each different data storage region.

FIG. 3A illustrates the case where the number of tracks in the data storage region on disk surface 40 is even. The data storage region on disk surface 40 is divided into a first region A1 and a second region A2 both having the same number of tracks. Generally, when using one disk surface, the tracks are arranged concentrically on disk surface 40, and are assigned numbers that increase by one from zero and extend from the outermost track to the innermost track of the data storage region. Otherwise, in a typical hard disk drive (HDD) having more than two platters of disks 10, a cylinder is numbered in the manner above. In the following description, assuming that only one disk surface 40 is used, its numbering also corresponds to one disk surface 40. Then, assuming that the total number of tracks on disk surface 40 is N (wherein N is a natural even number), the tracks from 0 to N/2-1 belong to first region A1 and the tracks from N/2 to N-1 belong to second region A2. Accordingly, first region A2 is accessed by first head 52, and second region A2 is accessed by second head 54 in one situation. In another situation, first head 52 may access the tracks of second region A2, and second head 54 may access the tracks of first region A1.

On the other hand, when data on disk surface 40 is not accessed or the power is turned off, heads 52 and 54 are parked in a parking zone specifically provided on disk surface 40 to protect disk surface 40 and heads 52 and 54. Accordingly, first and second parking zones 58 and 60 for parking first and second heads 52 and 54 are respectively formed at the outermost circumferential region and the innermost circumferential region of disk surface 40. For example, when first head 52 is positioned in first parking region 58, second head 54 is positioned in second parking zone 60.

Accordingly, as illustrated in FIG. 4, heads 52 and 54 are properly parked. The distance between first head 52 and second head 54 is set so that when one of the first and second heads 52 and 54 is placed in first parking zone 58, the other head is placed in second parking zone 60, and vice-versa.

Figure 5A:
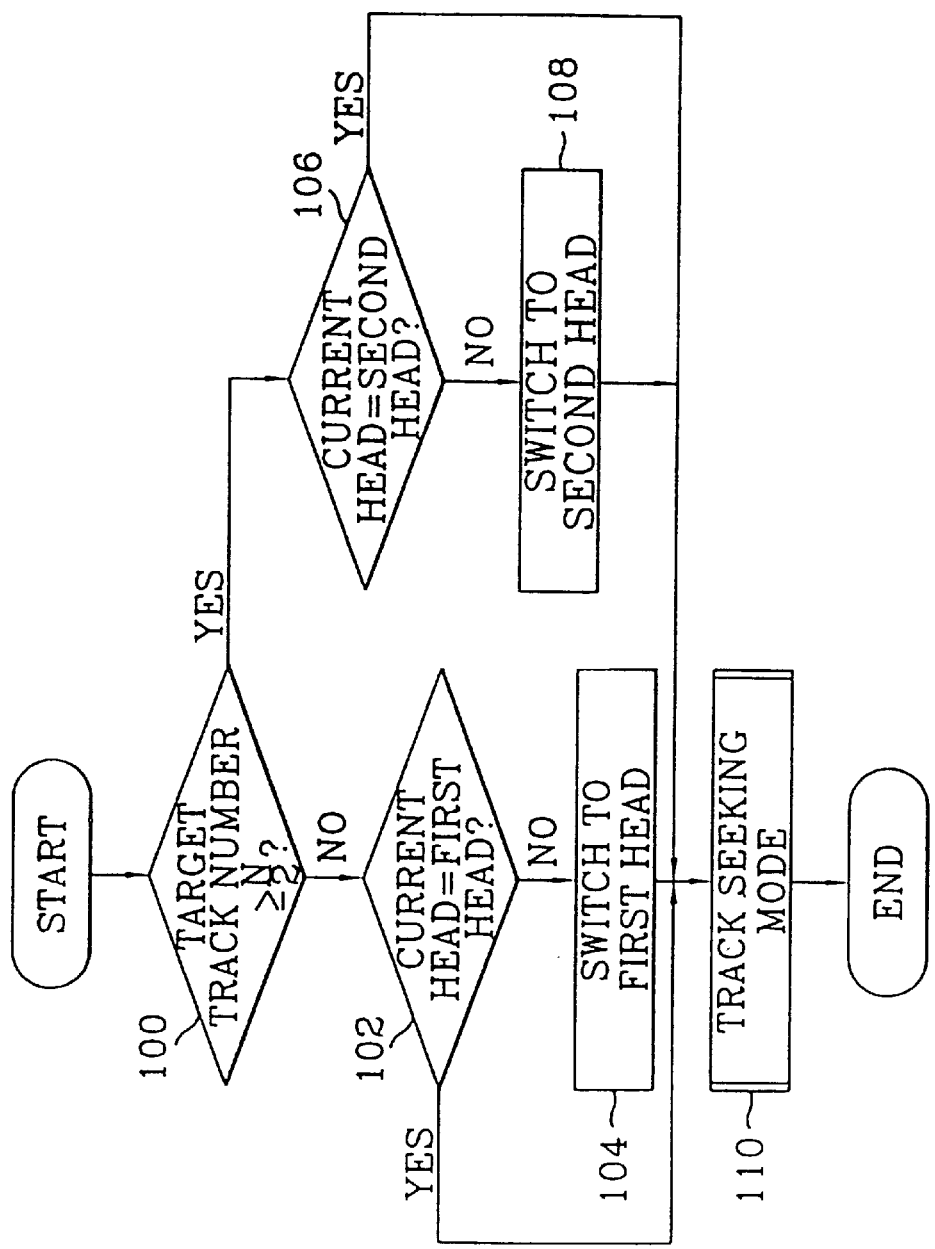
FIGS. 5A and 5B are flowcharts for controlling head switching for a track seeking operation according to the embodiment of FIG. 2.

When the total number of tracks in the data storage region of disk surface 40 is N and even, as illustrated in FIG. 3A, a switching control flowchart for seeking a target track according to one embodiment of the present invention is shown in FIG. 5A. The flowchart of FIG. 5A illustrates a situation in which the present invention is performed by programming microcontroller 26 to allocate first head 52 to first region A1 and second head 54 to second region A2. If microcontroller 26 is to access a particular target track on disk surface 40, microcontroller 26 determines, in step 100, whether the number of the target track is greater than or equal to N/2. If the number of target track is not greater than or equal to N/2, microcontroller 26 determines that the position of the target track is within first region A1, and performs step 102.

In step 102, microcontroller 26 detects whether a current head selected corresponding to disk surface 40 is first head 52. When the current head is second head 54, microcontroller 26 controls pre-amplifier 16, selects first head 52 as the head to access the target track, switches to first head 52 in step 104, and executes a track seeking mode in step 110. If, in step 102, the current head is first head 52, step 110 is performed since first head 52 is allocated to first region A1.

Referring back to step 100, if the number of the target track is greater than or equal to N/2, the target track is determined to lie within second region A2, and step 106 is performed.

In step 106, microcontroller 26 determines whether the current head is second head 54. When the current head is first head 52, microcontroller 26 controls pre-amplifier 16, selects second head 54 as the head to access the target track, switches to second head 54 in step 108, and then performs step 110. If, in step 106, the current head is second head 54, step 110 is performed since second head 52 is allocated to second region A2.

In step 110, the target track is sought by performing a normal track seeking mode using the selected head. Accordingly, data is written to and read fron the target track.

FIG. 3B illustrates the case where the number of tracks in the data storage region of disk surface 40 is odd, and the data storage region is equally divided into first and second regions A1 and A2 both having the same number of tracks. Assuming that the total number of tracks on disk surface 40 is N (wherein N is a natural odd number), the tracks from (N-1)/2 to N-1 belong to second region A2. In practice, the track (N-1)/2 disposed in the center of the N tracks may be included in either of the first and second regions A1 and A2. In the present invention, track (N-1)/2 is included in both regions. In one situation, the tracks in first region A1 are accessed by first head 52, and the tracks in second region A2 are accessed by second head 54. The track (N-1)/2 is accessed by the current head regardless of whether it is first head 52 or second head 54. In another situation, first head 52 accesses the tracks in second region A2, and second head 54 accesses the tracks in first region A1.

Figure 5B:
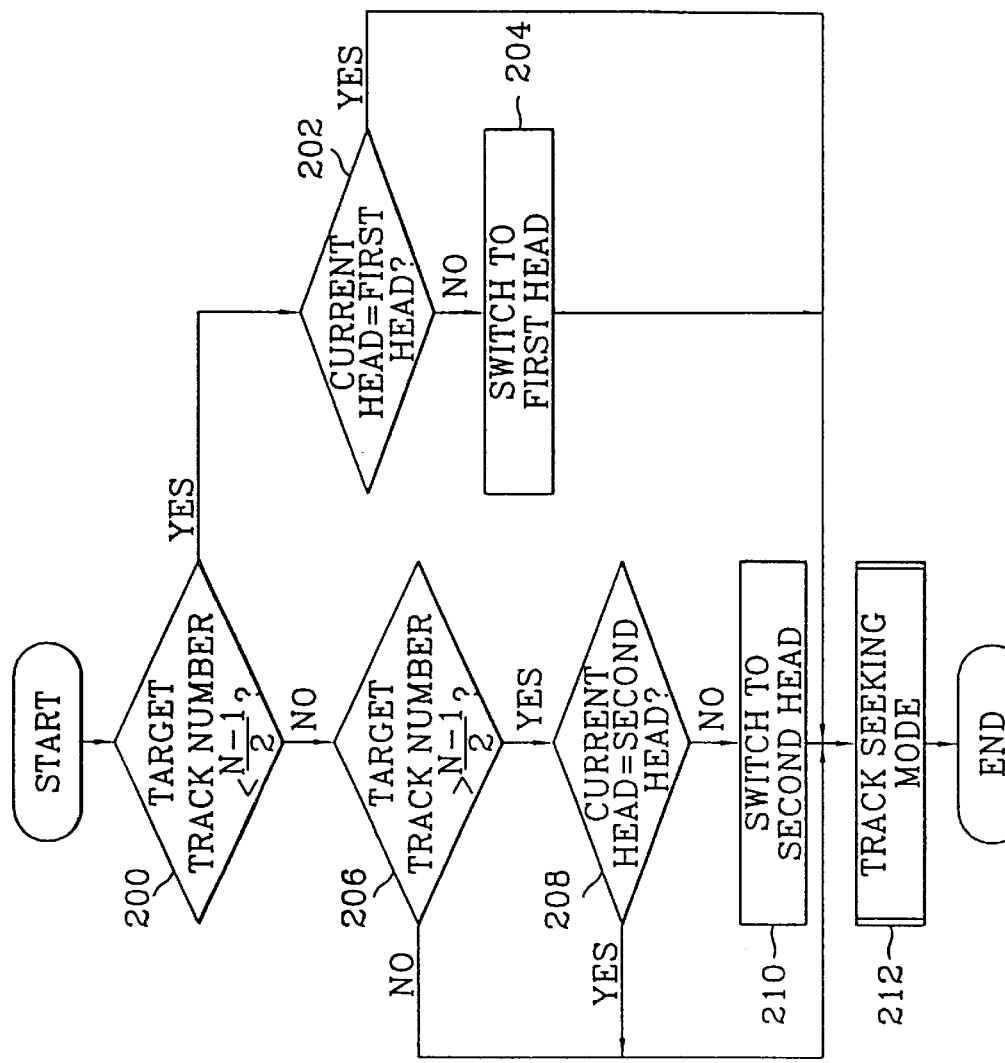

When the total number of tracks in the data storage region of disk surface 40 is N and odd, as illustrated in FIG. 3B, a switching control flowchart for seeking the track according to one embodiment of the present invention is shown in FIG. 5B. The flowchart of FIG. 5B illustrates the example where the present invention is performed by programming microcontroller 26 to allocate first head 52 to first region A1 and second head 54 to second region A2. If microcontroller 26 is to access a particular target track on disk surface 40, microcontroller 26 determines, in step 200, whether the number of the target track is less than (N-1)/2. If the number of the target track is less than (N-1)/2, microcontroller 26 determines that the position of the target track is within first region A1, and then performs step 202.

In step 202, microcontroller 26 determines whether the current head is first head 52. When the current head is second head 54, microcontroller 26 controls pre-amplifier 16, selects first head 52 as the head to access the target track, switches to first head 52 in step 204, and then performs the track seeking mode in step 212. If, in step 202, microcontroller 26 determines that the current head is first head 52, step 212 is performed.

Referring back to step 200, if the number of the target track is not less than (N-1)/2, then step 206 is performed. In step 206, microcontroller 26 determines whether the number of the target track greater than (N-1)/2. If the number of the target track is greater than (N-1)/2, the target track is determined to lie within second region A2, and step 208 is then performed.

In step 208, microcontroller 26 determines whether the current head is second head 54. When the current head is first head 52, microcontroller 26 controls pre-amplifier 16, selects second head 54 as the head to access the target track, switches to second head 54 in step 210, and then performs step 212. If, in step 208, the current head is determined to be second head 54, step 212 is performed.

Referring back to step 206, if the target track number is not greater than (N-1)/2, the target track number is determined to be (N-1)/2, and either first head 52 or second head 54 can access the target track. Then, step 212 is performed.

In step 212, the target track is sought by performing a normal track seeking mode using the selected head, and data is written to or read from the target track.

Therefore, by seeking a target track using two heads respectively allocated to two data storage regions, the shifting distance between tracks is shortened, thereby largely reducing the seek time.

In the above-mentioned description, the head switching control method contemplates two different cases: (1) when the number of tracks in the data storage regions of disk surface 40 is even (see FIGS. 3A and 5A), and (2) when the number of tracks in the data storage regions of disk surface 40 is odd (see FIGS. 3B and 5B). Therefore, even though the number of tracks on one disk surface ranges from several hundred to thousands, the data storage region may be halved regardless of whether the number of tracks is even or odd.

On the other hand, without allocating two heads respectively to two halved data storage regions, the head positioned closer to the target track may be selected as the head to access the target track.

Figure 6:
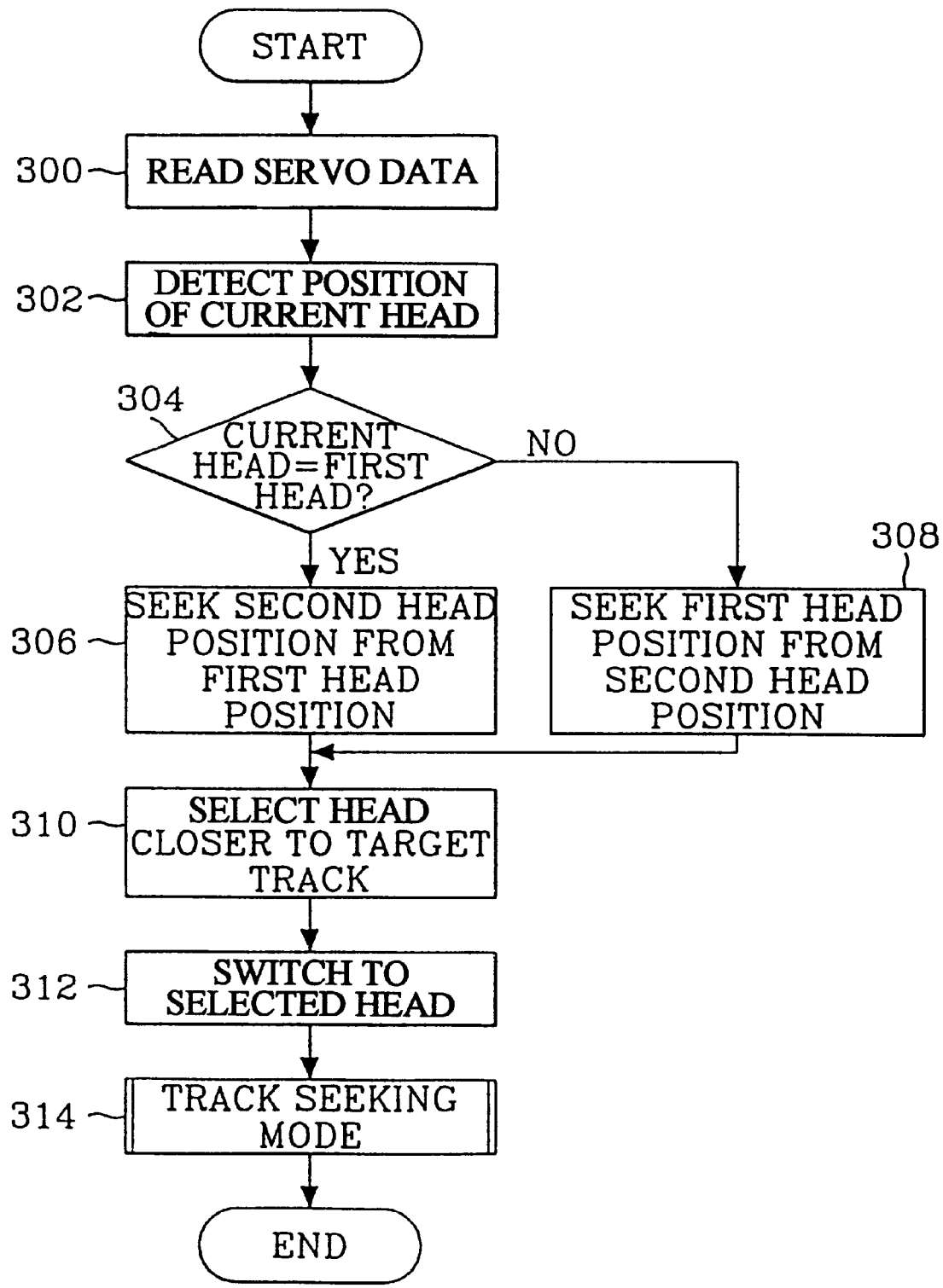
FIG. 6 is a flowchart for controlling head switching for a track seeking operation according to another embodiment of the present invention.

FIG. 6 is a flowchart for controlling head switching for seeking a track according to another embodiment of the present invention, wherein the head positioned closer to the target track is selected. The steps of FIG. 6 can be programmed in microcontroller 26. If microcontroller 26 decides to access a specific target track on disk surface 40, the current head of first and second heads 52 and 54 reads servo data from a current track in step 300, and detects the position of the current head through track data seeking unit 22 in step 302. Then, in step 304, microcontroller 26 determines whether the current head is first head 52. If the current head is first head 52, the position of second head 54 is determined from the position of first head 52, in step 306. Alternatively, if the current head is second head 54, the position of first head 52 is determined from the position of second head 54, in step 308. Determining the position of one of the heads based on the position of the current head is enabled by knowing the number of tracks corresponding to the distance between first and second heads 52 and 54. Next, in step 310 microcontroller 26 selects the head that is closer to the target track. In step 312, microcontroller 26 switches to the selected head that is closer to the target track for accessing the target track on disk surface 40. In step 314, the track seeking mode is executed using the selected head, and data is accordingly written to or read from the target track.

Therefore, in this case, by seeking a target track within one of two halved data storage regions using the head that is closer to the target track, the head shifting distance is shortened, thereby largely reducing the seek time.

Figure 7:
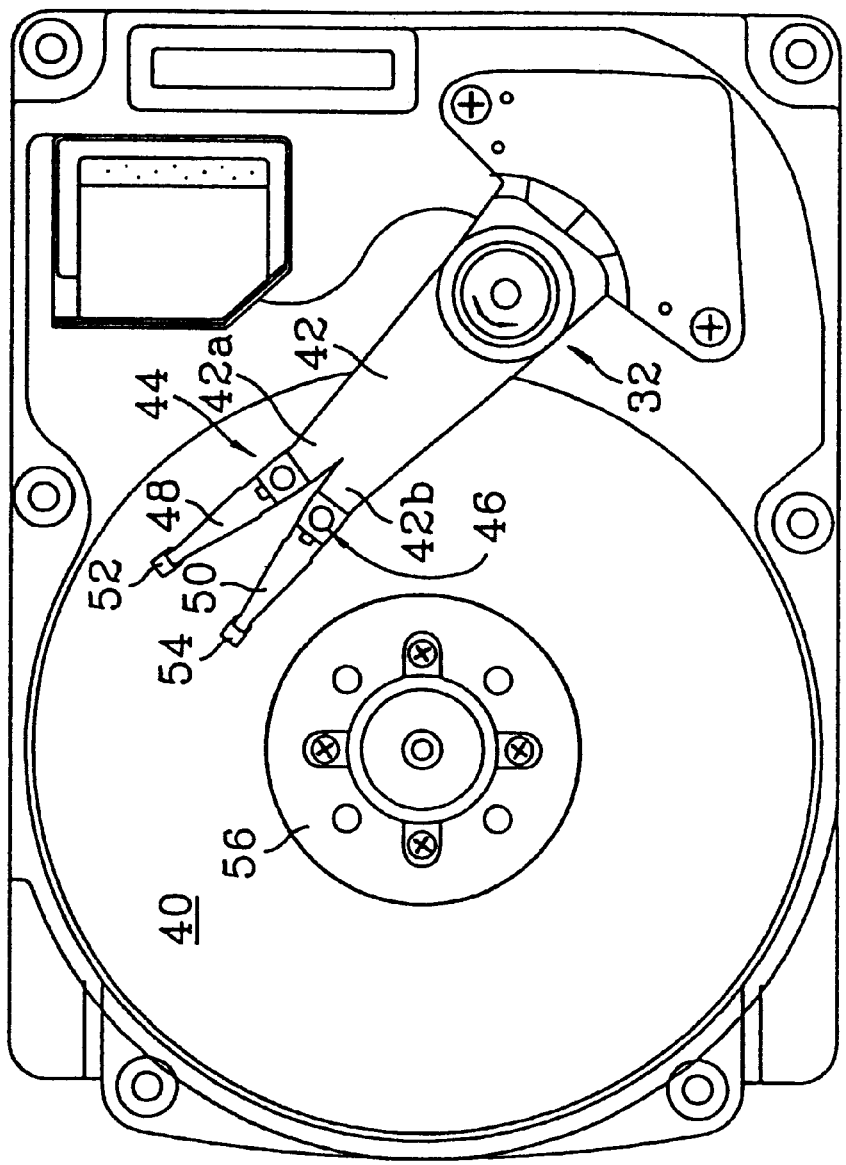
FIG. 7 illustrates an exemplary configuration of a hard disk assembly constructed according to still another embodiment of the present invention.

FIG. 7 illustrates an exemplary configuration of a hard disk assembly constructed according to still another embodiment of the present invention. In FIG. 7, two head gimbals assemblies (HGAs) 44 and 46 are mounted over one disk surface 40. A support arm 42 is extended in the form of a "V", having one side connected to actuator 32, and another side divided into two sub-arms, namely a first arm 42a and a second arm 42b. First and second head gimbals assemblies (HGAs) 44 and 46 are connected to the ends of first and second arms 42a and 42b. First and second arms 42a and 42b are integrally formed at one end connected to actuator 32, but are separated at their other ends and extend along a single side of a rotation axis of disk 10. That is, both first arm 42a and second arm 42b extend outwardly to operate in correspondence with a single radius of disk 10. First and second heads 52 and 54 are respectively connected to ends of first and second arms 42a and 42b via first and second suspensions 48 and 50.

Figure 8:
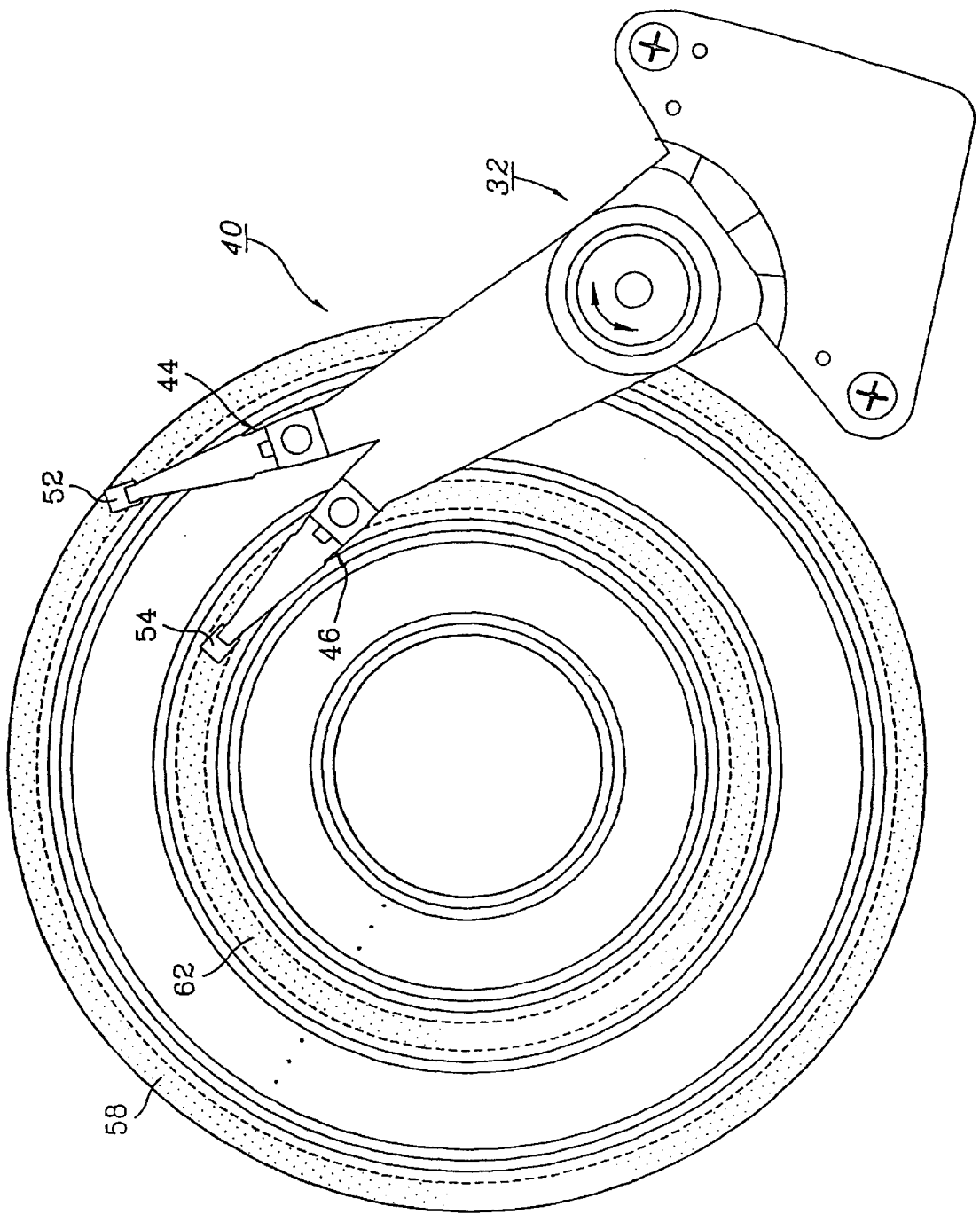
FIG. 8 illustrates a parking state according to the embodiment of FIG. 7.

In the configuration illustrated in FIG. 7, when data on disk surface 40 is not accessed or the power is turned off, heads are parked in parking zones specifically provided on disk surface 40 to protect disk surface 40 and first and second heads 52 and 54. Accordingly, first and second parking zones 58 and 62 for parking first and second heads 52 and 54 are respectively provided in the outermost circumferential region, and in a center region between the outermost circumferential region and the innermost circumferential region of disk surface 40. As shown in FIG. 8, when first head 52 is placed in first parking region 58, second head 54 is placed in second parking zone 62, and vice-versa. Alternatively, first parking zone 58 can be provided in the innermost circumferential region, rather than in the outermost circumferential region. In this case, first head 52 would park in second parking zone 62 and second head would park in first parking zone 58, and vice-versa. The distance between first head 52 and second head 54 is set such that when either first head 52 or second head 54 is placed in its respective parking zone, the other head is placed in the other parking zone.

In the configuration illustrated in FIG. 7, the access region for head switching on disk surface 40 is divided into two data storage regions, as illustrated in FIGS. 3A and 3B, and first and second heads 52 and 54 are respectively allocated to the data storage regions.

Figure 9:
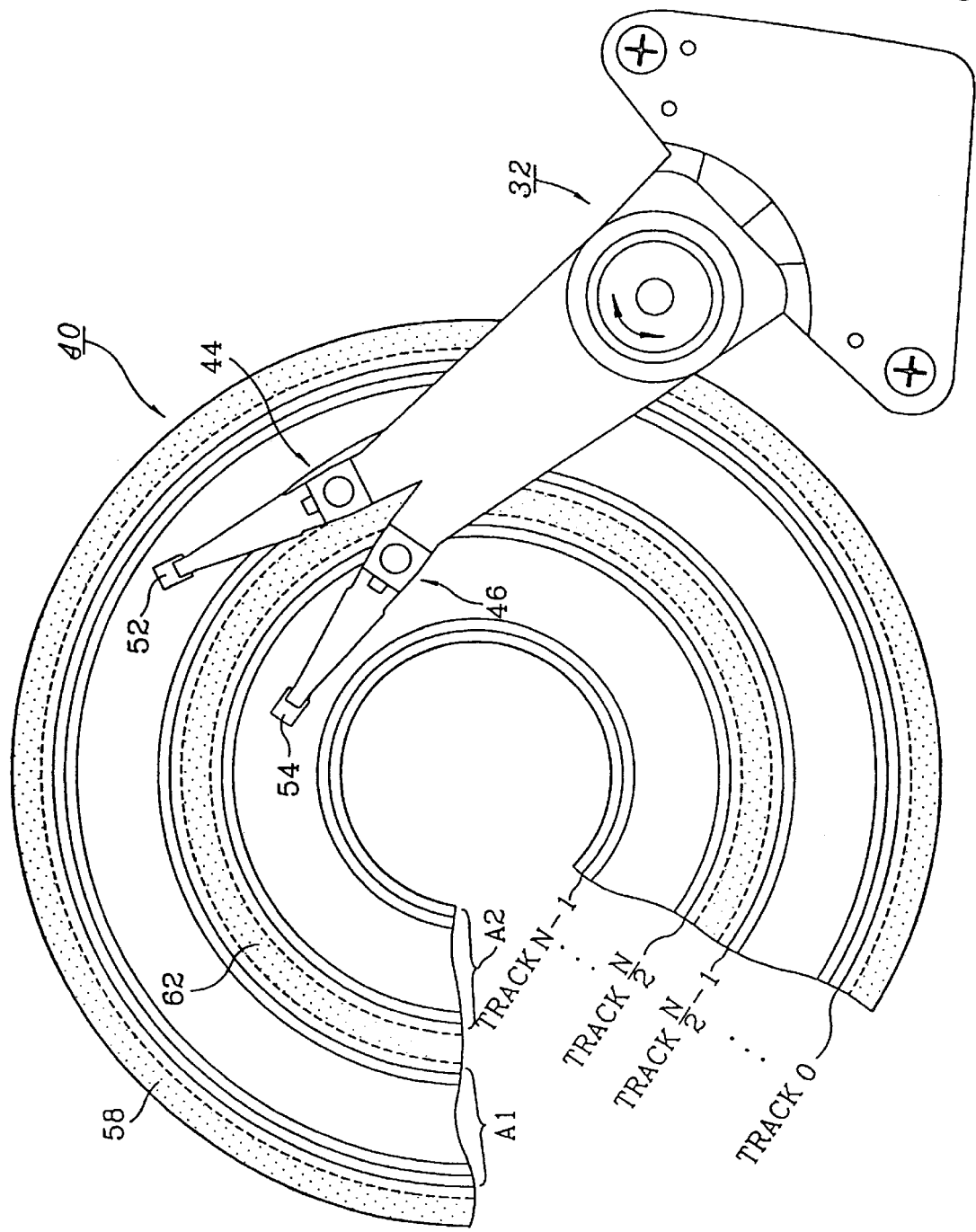
FIG. 9 illustrates an example of the allocation of the access region on a disk for head switching according to the embodiment of FIG. 7.

FIG. 9 illustrates an example of the allocation of the access region on a disk for head switching according to the embodiment of FIG. 7. That is, first and second heads 52 and 54 are respectively allocated to the data storage regions on disk surface 40. The data storage regions are divided in half on the basis of second parking zone 62. Accordingly, the data storage regions of disk surface 40 are divided into first and second regions A1 and A2 both having the same number of tracks. The tracks from 0 to N/2-1 belong to first region A1, and tracks N/2 to N-1 belong to second region A2.

Accordingly, first head 52 accesses the tracks in first region A1, and second head 54 accesses the tracks in second region A2. If necessary, the number of tracks in first and second regions A1 and A2 may be varied.

In case of allocating the access region on the disk as illustrated in FIG. 9, head switching is controlled according to the method illustrated in the flowchart of FIG. 5A.

As illustrated in the flowchart of FIG. 6, head switching can be controlled by selecting the head that is closer to the target track from a current position.

Figure 10:
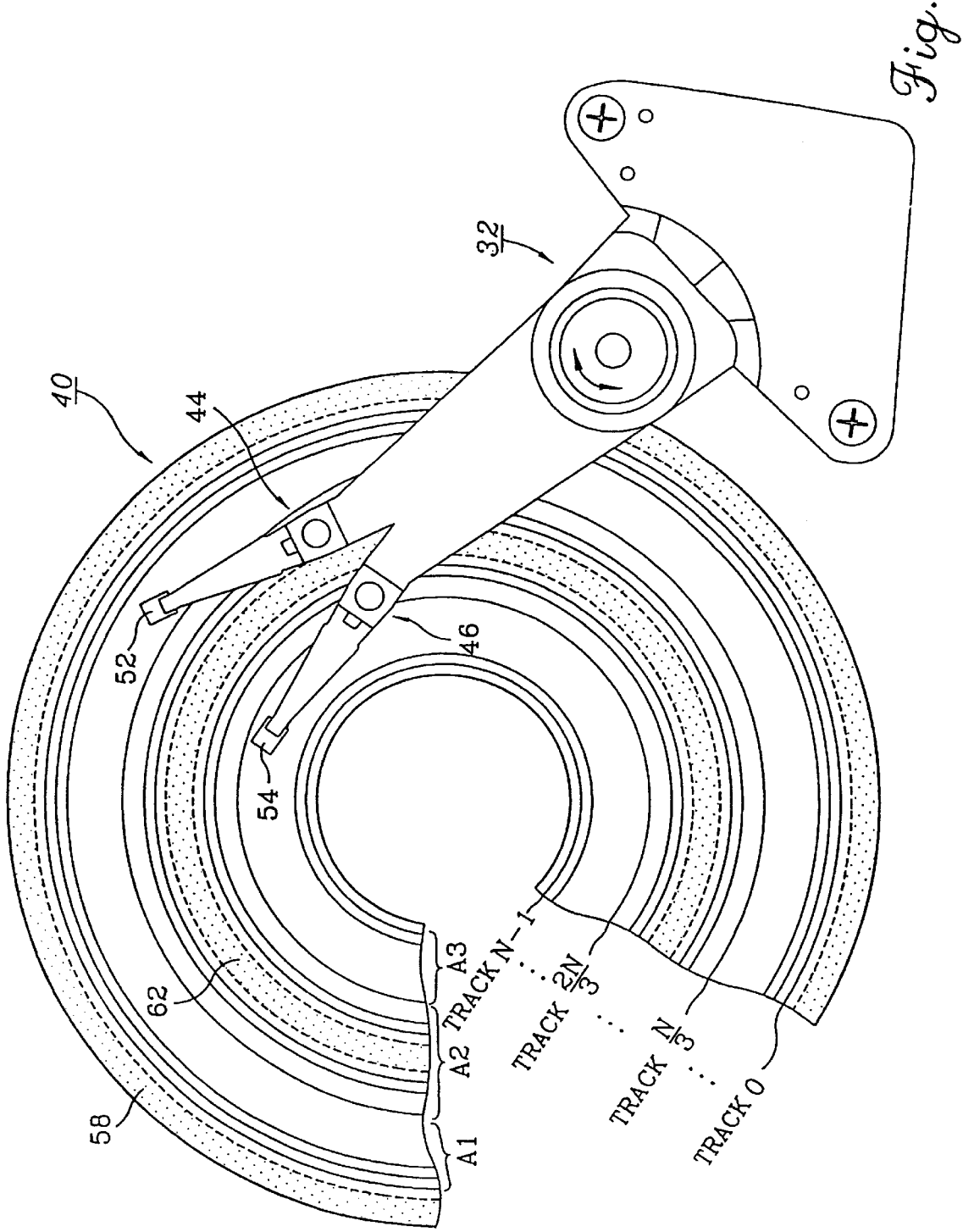
FIG. 10 illustrates an example of the allocation of the access region on a disk for head switching of yet another embodiment of the present invention.

FIG. 10 illustrates an example of the allocation of the access region on a disk for head switching of yet another embodiment of the present invention. In particular, FIG. 10 shows an example where the tracks between the innermost portion of the disk and the outermost portion of the disk are divided into three data storage regions, namely, first, second and third regions A1, A2 and A3. In this case, first head 52 is allocated to first region A1 at the outermost portion of the disk, and second head 54 is allocated to third region A3 at the innermost portion of the disk. Second region A2 is commonly accessed by first and second heads 52 and 54. In FIG. 10, tracks 0 to N/3-1 belong to first region A1, tracks N/3 to 2N/3-1 belong to second region A2, and tracks 2N/3 to N-1 belong to third region A3.

Figure 11:
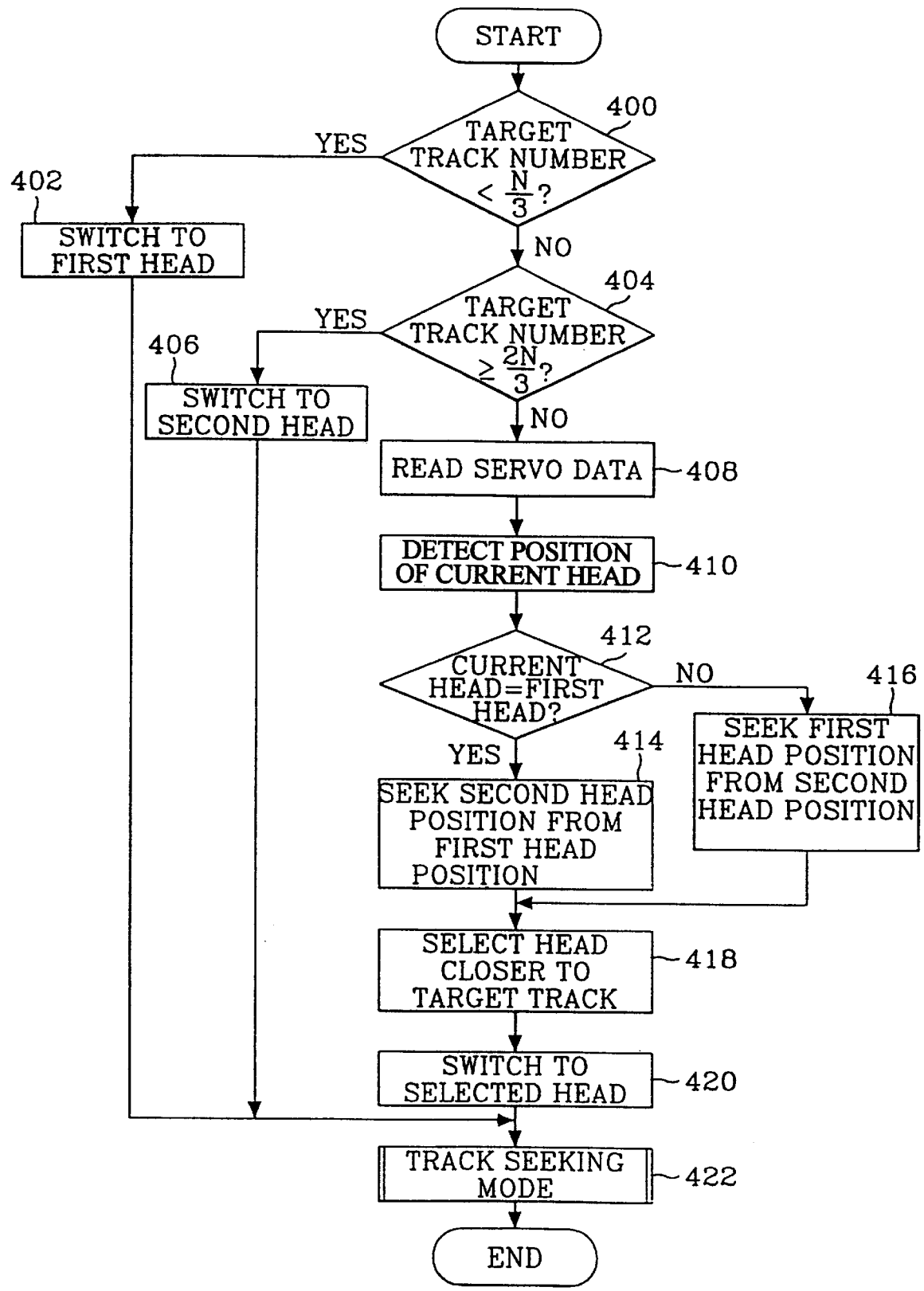
FIG. 11 is a flowchart for controlling a head switching for a track seeking operation according to the embodiment of FIG. 10.

When allocating the access region on the disk as illustrated in FIG. 10, head switching is controlled as shown in the flowchart of FIG. 11. The steps of FIG. 11 are programmed in microcontroller 26. When microcontroller 26 is to access a specific target track on disk surface 40, microcontroller 26 first determines whether the target track number is less than N/3. When the target track number is less than N/3, indicating that the target track is within first region A1, microcontroller 26 controls pre-amplifier 16, selects first head 52 for accessing the target track, switches to first head 52 in step 402, and then performs the track seeking mode in step 422. Alternatively, if the target track number is not less than N/3, microcontroller 26 determines whether the target track number is greater than or equal to 2N/3, in step 404. When the target track number is greater than or equal to 2N/3, indicating that the target track is within third region A3, microcontroller 26 controls pre-amplifier 16, selects second head 54 for accessing the target track, switches to second head 54 in step 406, and then performs step 422.

In step 404, when the target track number is not greater than or equal to 2N/3, the target track is determined to exist within second region A2. In this case, steps 408 through 420 are performed, and the head that is closer to the target track based on the current positions of first and second heads 52 and 54 is used to access the disk surface 40. First, servo data is read in step 408. Then, in step 410, track data seeking unit 22 detects the position of the current head by reading the servo data from the track where the current head of first and second heads 52 and 54 is placed. In step 412, a determination is made as to whether the current head is first head 52. If the current head is first head 52, the position of second head 54 is determined from the position of first head 52, in step 414. Alternatively, if the current head is second head 54, the position of first head 52 is determined from the position of second head 54, in step 416. Determining the position of one of the heads based on the position of the current head is enabled by knowing the number of tracks corresponding to the distance between first and second heads 52 and 54. Next, in step 418 microcontroller 26 selects the head that is closer to the target track. In step 420, microcontroller 26 switches to the selected head that is closer to the target track. Then, in step 422, the track seeking mode is executed using the selected head, and data is accordingly written to or read from the target track.

Therefore, in this case, by seeking a target track within one of three data storage regions using the head that is closer to the target track, the head shifting distance is shortened, thereby largely reducing the seek time.

The average seek time with the present invention is approximately 11% to 27% less than with other general disk drives. It shows a large difference in the verification of the response time considering the delay in the disk queue in proportion to the amount of load, and the present invention can reduce the response time by a minimum of 16% as compared to other general disk drives. While general disk drives show a drastic increase in response time at the load of 40 Hz, the present invention shows that increase at the load of about 50 Hz. In addition, in the two job loads reflecting the characteristics of a trace, the disk drive of the present invention shows an average response time of 50% to 80% better than that of other general disk drives. Consequently, the disk drive of the present invention having double heads is desirable in not only a general application environment, but also the application environment in which the ratio of the seek time in accessing the disk is relatively high.

As described above, the present invention uses double heads to access data on one disk surface, thereby largely reducing the track seeking time.

While there have been illustrated and described what are considered to be preferred embodiments of the present invention, it will be understood by those skilled in the art that various changes and modifications may be made, and equivalents may be substituted for elements thereof without departing from the true scope of the present invention. Specifically, double heads are employed to one disk surface in the present invention. However, in the case of using several disks, the present invention will control head switching on the basis of a cylinder number, rather than a track number. Also, the present invention applied to a hard disk drive (HDD) can also be applied to a floppy disk drive, and other disk writing devices without any substantial modifications. While the first and second arms 42a and 42b are extended in the form of a "V" from the portion connected to actuator 32 in embodiments of the present invention, these arms may be extended in the form of a "U" or "C" without departing from the central scope of the present invention. Concerning the examples of dividing the data storage region into two or three parts of an equal number of tracks, if necessary, the number of tracks in each data storage region may be varied. Therefore, it is intended that the present invention not be limited to the particular embodiments disclosed as the best mode contemplated for carrying out the present invention, but that the present invention include all embodiments falling within the scope of the appended claims.

What is claimed is:

1. A disk drive, comprising:

a disk having a plurality of tracks formed concentrically along a first surface of said disk for storing data, said plurality of tracks being divided into first and second data storage regions positioned between an innermost circumferential region and an outermost circumferential region of said disk;

first and second heads for writing and reading the data to and from said first surface of said disk, said first head being positioned to access said first data storage region while said second head is positioned to access said second data storage region, and said first head being positioned to access said second data storage region while said second head is positioned to access said first data storage region;

first and second arm assemblies respectively connected to said first and second heads, said first arm assembly extending said first head over a first radius of said disk, and said second arm assembly extending said second head over a second radius of said disk;

an actuator for shifting said first and second heads among said plurality of tracks by driving said first and second arm assemblies;

means for selecting one of said first and second heads by a predetermined control; and a control unit for providing said predetermined control to enable selection of the one of said first and second heads that is closer to a target position on said first surface of said disk so that the one of said first and second heads that is closer to said target track can access the data at said target track.

2. The disk drive as claimed in claim 1, wherein said first surface of said disk comprises a first parking zone positioned at said outermost circumferential region, and a second parking zone positioned at said innermost circumferential region.

3. The disk drive as claimed in claim 2, wherein a distance between said first and second heads is defined so that said first head is positioned in said first parking zone while said second head is positioned in said second parking zone, and said first head is positioned in said second parking zone while said second head is positioned in said first parking zone.

4. The disk drive as claimed in claim 2, wherein said first and second arm assemblies are joined together at a common region that connects said first and second arm assemblies to said actuator, said first and second arm assemblies extending outwardly from said common region to form a "V" shape.

5. A disk drive, comprising a disk having a plurality of tracks formed concentrically along a first surface of said disk for storing data, said plurality of tracks being divided into a first data storage region, a second data storage region and a third data storage region positioned respectively between an outermost circumferential region and an innermost circumferential region of said disk;

a first parking zone positioned at said outermost circumferential region, and a second parking zone positioned at a center region between said outermost circumferential region and said innermost circumferential region, said second data storage region comprising a plurality of tracks positioned between said second parking zone and the tracks of said first data storage region, and a plurality of tracks positioned between said second parking zone and the tracks of said third data storage region;

a first head for writing and reading data to and from said first and second data storage regions;

a second head for writing and reading data to and from said second and third data storage regions; and means for determining whether a target track is in said first data storage zone for controlling said first head to seek said target track, for determining whether said target track is in said third data storage zone for controlling said second head to seek said target track, and for determining which of said first and second heads is closer to said target track for controlling the closer of said first and second heads to seek said target track.

6. The disk drive as set forth in claim 5, further comprising:

a support arm having a first end connected to an actuator, and having a second end divided into a "V" shape to form a first sub-arm and a second sub-arm; and first and second head gimbals assemblies connected to respective ends of said first and second sub-arms for respectively supporting said first and second heads.

7. The disk drive as set forth in claim 6, wherein said first and second heads are spaced apart from each other so that when said first head is parked in said first parking zone said second head is parked in said second parking zone.

8. A head switching control method for accessing a target track in a disk drive having first and second heads respectively allocated to different positions on a first surface of a disk having a plurality of tracks each of which contains a number indicative of the track's position, said plurality of tracks being divided into first and second data storage regions existing between respectively an outermost circumferential region and an innermost circumferential region of said first surface of said disk, said first and second heads being shifted simultaneously along said first surface of said disk by a single actuator, said method comprising the steps of:

determining a number of said target track;

determining whether said target track's number is less than a predetermined number; and selecting one of said first and second heads as a result of a determination made in said step of determining whether said target track's number is less than said predetermined number.

9. The method as set forth in claim 8, wherein said step of selecting comprises the steps of:

determining whether a currently active head is said first head when it is determined that said target track's number is less than said predetermined number;

selecting said first head when it is determined that said currently active head is not said first head;

controlling said first head to seek said target track when it is determined that said currently active head is said first head or when said first head is selected by said selecting step;

ascertaining whether a currently active head is said second head when it is determined that said target track's number is not less than said predetermined number;

selecting said second head when it is ascertained that said currently active head is not said second head; and controlling said second head to seek said target track when it is ascertained that said currently active head is said second head or when said second head is selected by said step of selecting said second head.

10. The method as set forth in claim 8, wherein said step of selecting comprises the steps of:

determining whether a currently active head is said first head when it is determined that said target track's number is less than said predetermined number;

selecting said first head when it is determined that said currently active head is not said first head;

controlling said first head to seek said target track when it is determined that said currently active head is said first head or when said first head is selected by said selecting step;

determining whether said target track's number is greater than said predetermined number when it is determined that said target track's number is not less than said predetermined number;

ascertaining whether a currently active head is said second head when it is determined that said target track's number is greater than said predetermined number;

selecting said second head when it is ascertained that said currently active head is not said second head; and controlling said second head to seek said target track when it is determined that said target track's number is not greater than said predetermined number, when it is ascertained that said currently active head is said second head or when said second head is selected by said step of selecting said second head.

11. The method as set forth in claim 8, wherein said step of selecting comprises the steps of:

selecting said first head when it is determined that said target track's number is less than said predetermined number;

seeking said target track with said first head;

determining whether said target track's number is greater than or equal to a second predetermined number when the result of said step of determining whether said target track's number is less than a predetermined number is negative;

selecting said second head when it is determined that said target track's number is greater than or equal to said second predetermined number;

seeking said target track with said second head when said second head is selected;

reading servo data of a current track and detecting a position of a currently active head based on said servo data, when it is determined that said target track's number is not greater than nor equal to said second predetermined number;

determing whether said currently active head is said first head;

determining a position of said second head based on the detected position of said first head when it is determined that said first head is said currently active head;

determining a position of said first head based on the detected position of said second head when it is determined that said first head is not said currently active head;

selecting one of said first and second heads by determining which of said first and second heads is closer to said target track; and seeking said target track based on the selected one of said first and second heads.

12. A head switching control method for accessing a target track in a disk drive having first and second heads respectively allocated to different positions on a first surface of a disk having a plurality of tracks each of which contains a number indicative of the track's position, said plurality of tracks being divided into first and second data storage regions existing between respectively an outermost circumferential region and an innermost circumferential region of said first surface of said disk, said first and second heads being shifted simultaneously along said first surface of said disk by a single actuator, said method comprising the steps of:

determining a number of said target track;

reading servo data of a current track and detecting a position of a currently active head based on said servo data;

determing whether said currently active head is said first head;

determining a position of said second head based on the detected position of said first head when it is determined that said first head is said currently active head;

determining a position of said first head based on the detected position of said second head when it is determined that said first head is not said currently active head;

selecting one of said first and second heads by determining which of said first and second heads is closer to said target track; and seeking said target track based on the selected one of said first and second heads.

* * * * *